United States Patent
Seto

(10) Patent No.: US 9,856,367 B2
(45) Date of Patent: Jan. 2, 2018

(54) VERMICULITE ALTERNATIVE FOR PACKAGING MATERIAL

(71) Applicant: Alfred Seto, Hamilton (CA)

(72) Inventor: Alfred Seto, Hamilton (CA)

(73) Assignee: Envirosystems, Inc., Fridley, MN (US)

( * ) Notice: Subject to any disclaimer, the term of this patent is extended or adjusted under 35 U.S.C. 154(b) by 176 days.

(21) Appl. No.: 14/668,594

(22) Filed: Mar. 25, 2015

(65) Prior Publication Data

US 2016/0280891 A1    Sep. 29, 2016

(51) Int. Cl.

| | |
|---|---|
| *C08L 1/02* | (2006.01) |
| *B29C 39/38* | (2006.01) |
| *B29C 39/44* | (2006.01) |
| *B29C 39/00* | (2006.01) |
| *B29C 37/00* | (2006.01) |
| *B29K 7/00* | (2006.01) |
| *B29K 401/00* | (2006.01) |
| *B29L 31/00* | (2006.01) |
| *B29K 105/00* | (2006.01) |
| *B29K 105/26* | (2006.01) |
| *B29C 35/04* | (2006.01) |
| *B29C 35/08* | (2006.01) |
| *B29B 17/00* | (2006.01) |

(52) U.S. Cl.
CPC ............ *C08L 1/02* (2013.01); *B29C 37/0092* (2013.01); *B29C 39/003* (2013.01); *B29C 39/38* (2013.01); *B29C 39/44* (2013.01); *B29B 17/00* (2013.01); *B29C 2035/046* (2013.01); *B29C 2035/0822* (2013.01); *B29C 2035/0855* (2013.01); *B29K 2007/00* (2013.01); *B29K 2105/0064* (2013.01); *B29K 2105/26* (2013.01); *B29K 2401/00* (2013.01); *B29L 2031/00* (2013.01); *B29L 2031/714* (2013.01); *Y02W 30/62* (2015.05)

(58) Field of Classification Search
CPC ..... C08L 1/02; B29C 37/0092; B29C 39/003; B29C 39/38; B29C 39/44; B29C 2035/046; B29C 2035/0855; B29C 2035/0822; B29B 17/00; B29L 2031/714; B29K 2105/0064; B29K 2105/26; B29K 2401/00

See application file for complete search history.

(56) References Cited

U.S. PATENT DOCUMENTS

2009/0275687 A1* 11/2009 Chrzanowski ...... B29C 45/0001
                                                                524/425

* cited by examiner

*Primary Examiner* — Christopher M Rodd
(74) *Attorney, Agent, or Firm* — Rutan & Tucker LLP; Hani Z. Sayed

(57) ABSTRACT

An apparatus and a method are provided for a latex-based packaging material configured to provide a dust-free alternative to vermiculite packaging materials. The latex-based packaging material comprises a portion of a latex-based waste formulated into a recycled latex emulsion, and a portion of particulate material into which the recycled latex emulsion is mixed so as to form a latex-based pulp. In some embodiments, additional components, such as any of various plasticizers, coloring agents, or hardeners, may be included in the latex-base pulp. The latex-based pulp is dispensed and dried so as to form the latex-based packaging material in a variety of desired shapes. Drying may be accomplished by way of unaided atmospheric evaporation, or by way of various conventional drying methods. In some embodiments, the desired shape of the packaging material comprises latex-based packaging peanuts suitable for separating and cushioning forces between containers during transportation in a larger container.

10 Claims, 1 Drawing Sheet

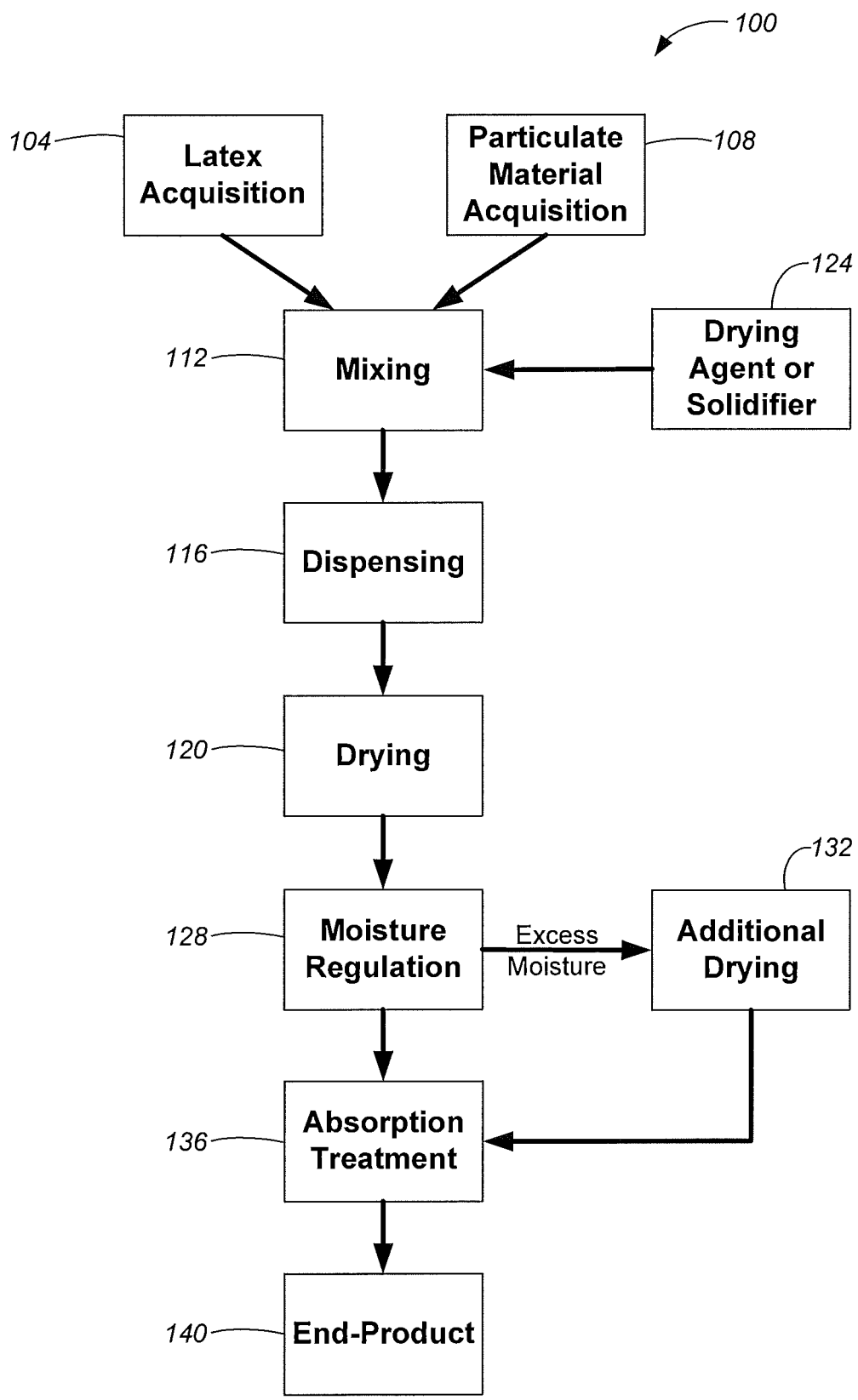

VERMICULITE ALTERNATIVE FOR PACKAGING MATERIAL

FIELD

The field of the present disclosure generally relates to recycling of certain waste. More particularly, the field of the present disclosure relates to recycling of latex paints and other similar materials to be utilized as an ingredient in a packaging material which may be used as an alternative to vermiculite-based packaging materials.

BACKGROUND

Latex paint is in exceedingly common usage not only by the general public but also by businesses. In recent years there has been a direction of movement from solvent-based paint to the latex type of paint. The main objection to a solvent-based paint is to its emission within the air of a petroleum based substance which when breathed is believed to be damaging to humans and is also potentially explosive. The result has been a substantial increase in the volume of usage of latex paints which similarly increased the waste of latex paint.

Whenever a decision is made to paint a given structure, invariably there will be provided an amount in excess of that which is actually needed. This excess becomes waste which usually is discarded. Disposal of latex paint within landfills has been increasingly objected to, which has resulted in increasingly restrictive state, local, and federal regulations, requiring that latex paint waste is to be handled as hazardous waste. As will be appreciated, since disposing of hazardous waste is extremely expensive, it is desirable and advantageous to instead use the hazardous waste in a process which produces other useful materials, thereby eliminating a need for disposing of the hazardous waste.

Packaging materials are widely used industrially and domestically to cushion products ranging from delicate equipment to office supplies so as to prevent damage to the products during shipment and handling. Suitable packaging materials often are composed of an expanded foam providing a low density, flexible packaging that protects a product from damage without adding significantly to the weight of the product when shipped. Although conventional expanded foam materials adequately cushion a product, disposal of the materials is difficult because they may not be biodegradable or recyclable.

Several problems are associated with conventional packaging materials, such as expanded polystyrene peanuts. Safety problems arise during manufacture because the peanuts are formed from styrene monomer which is hazardous to workers if inhaled or ingested. The packaging peanuts also accumulate static charges that cause them to stick to a product when the peanuts are closely packed around the product within a shipping carton. Another disadvantage associated with the polystyrene peanuts arises when the packaged product is a breakable container filled with a solvent, solution, or other liquid. If the container breaks during shipment, or is not sealed properly, the liquid will leak throughout the shipping carton. Polystyrene peanuts do not absorb the liquid to minimize such leakage, and often shrink considerably when exposed to liquid, losing their cushioning effect. Furthermore, the nonbiodegradable peanuts are often discarded after use, adding to existing landfill waste disposal problems.

Expanded vermiculite is a moisture absorbent packaging material which is suitable for packaging glass containers filled with liquid. Vermiculite, however, exhibits fine dust which adheres to glass and plastic. The fine dust can contaminate solvents and damage electronic equipment when the dust remains on the products after being unpackaged. Although a product may be sealed with a packaging film, the fine dust often sticks to the product as it is being removed from the film. Vermiculite is also environmentally harmful because it is not biodegradable and cannot be recycled.

Starch based formulations have also been used to prepare biodegradable packaging materials. Starch based peanuts, however, may also be unsuitable for packaging breakable containers because they may dissolve in the presence of liquid which may leak from the containers. Starch based products also tend to become tacky when exposed to conditions of high humidity which may exist upon shipping and handling of a product.

Recycled newspaper has been used to form a biodegradable, recyclable packaging material. These materials, formed from aqueous slurries of chopped newspapers, are molded into thin hollow walled shells or are extruded as pellets. Although these materials employ waste paper materials, they have several drawbacks. Such packaging materials do not have the cushioning properties and low density provided by expanded foam materials. The materials also require a significant amount of storage space before they are reused or transported for recycling.

What is needed, therefore, is a packaging material which overcomes the disadvantages associated with conventional packaging materials while also reducing the need for disposing of latex-based hazardous waste. The present disclosure provides such an improved packaging material.

SUMMARY

An apparatus and a method are provided for a latex-based packaging material configured to provide a dust-free alternative to vermiculite packaging materials. The latex-based packaging material comprises a portion of a latex-based waste formulated into a recycled latex emulsion, and a portion of particulate material into which the recycled latex emulsion is mixed so as to form a latex-based pulp. In some embodiments, additional components, such as any of various plasticizers, coloring agents, or hardeners, may be included in the latex-base pulp. The latex-based pulp is dispensed and dried so as to form the latex-based packaging material in a variety of desired shapes. Drying may be accomplished by way of unaided atmospheric evaporation, or by way of various conventional drying methods. In some embodiments, the desired shape of the packaging material comprises latex-based packaging peanuts suitable for separating and cushioning forces between containers during transportation in a larger container.

In an exemplary embodiment, an apparatus for a latex-based packaging material comprises a portion of a latex-based waste formulated into a recycled latex emulsion; and a portion of particulate material into which the recycled latex emulsion is mixed, thereby forming a pulp which may be dispensed and dried so as to form the latex-based packaging material in a desired shape.

In another exemplary embodiment, the pulp further comprises portions of additional components, such as any of various plasticizers, coloring agents, or hardeners. In another exemplary embodiment, the desired shape comprises latex-based packaging peanuts suitable for separating and cushioning forces between containers during transportation in a larger container.

In another exemplary embodiment, the latex-based waste is recycled liquid latex paint. In another exemplary embodiment, the latex-based waste comprises recycled semi-liquid latex paint and coatings. In another exemplary embodiment, the particulate material comprises a mixture of cellulose and lignin. In another exemplary embodiment, the particulate material comprises sawdust.

In an exemplary embodiment, a method for preparing a packaging material comprises receiving a portion of latex-based waste; formulating the latex-based waste into a recycled latex emulsion; acquiring a portion of suitable particulate material; mixing and blending the latex-based emulsion with the particulate material so as to form a latex-based pulp; dispensing the latex-based pulp so as to form a desired shape; drying to cure the latex-based pulp into the desired shape; and treating the latex-based shape to limit moisture absorption.

In another exemplary embodiment, the latex-based waste is recycled liquid latex paint. In another exemplary embodiment, the latex-based waste comprises recycled semi-liquid latex paint and coatings. In another exemplary embodiment, the particulate material comprises cellulose and lignin. In another exemplary embodiment, the particulate material comprises sawdust.

In another exemplary embodiment, mixing further comprises including portions of additional components, such as any of various plasticizers, coloring agents, or hardeners. In another exemplary embodiment, the desired shape of the packaging material comprises latex-based packaging peanuts configured to provide a substantially dust-free alternative to vermiculite packaging peanuts.

In another exemplary embodiment, drying comprises allowing the latex-based pulp to dry naturally by way of unaided atmospheric evaporation. In another exemplary embodiment, mixing further comprises incorporating a drying agent or a solidifier so as to reduce the time required to complete drying of the latex-based pulp. In another exemplary embodiment, the latex-based pulp is dried by way of conventional drying methods, such as hot air, microwave heating, or radiant infrared heating.

In another exemplary embodiment, regulating a moisture level within the desired shape. In another exemplary embodiment, regulating comprises measuring a moisture level within the desired shape. In another exemplary embodiment, regulating comprises applying additional drying to the desired shape when too much moisture is measured.

BRIEF DESCRIPTION OF THE DRAWINGS

The drawings refer to embodiments of the present disclosure in which:

FIG. 1 illustrates an exemplary embodiment of a preparation process for a vermiculite alternative suitable for use as a packaging material.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a latex-based packaging material configured to provide a dust-free alternative to vermiculite packaging materials. The latex-based packaging material comprises a portion of a latex-based waste formulated into a recycled latex emulsion, and a portion of particulate material into which the recycled latex emulsion is mixed so as to form a latex-based pulp. The latex-based waste is recycled liquid latex paint, or recycled semi-liquid latex paint and coatings. The particulate material generally comprises a source of cellulose and lignin, such as sawdust. In some embodiments, additional components, such as any of various plasticizers, coloring agents, or hardeners, may be included in the latex-base pulp. The latex-based pulp is dispensed and dried so as to form the latex-based packaging material in a variety of desired shapes. Drying may be accomplished by way of unaided atmospheric evaporation, or by way of various conventional drying methods. Further, a drying agent or a solidifier may be included so as to reduce the time required to complete drying of the latex-based pulp. In some embodiments, the desired shape of the packaging material comprises latex-based packaging peanuts suitable for separating and cushioning forces between containers during transportation in a larger container.

FIG. 1 illustrates an exemplary embodiment of a preparation process 100 for a vermiculite alternative suitable for use as a packaging material. The preparation process 100 begins at a latex acquisition step 104 and a particulate material acquisition step 108. In the latex acquisition step 104, a suitable portion of latex-based waste is acquired for use in the preparation process 100. In some embodiments, the latex-based waste is recycled liquid latex paint. In some embodiments, the latex-based waste comprises recycled semi-liquid latex paint and coatings. It will be appreciated that the latex-based waste may be acquired by way of various waste recycling programs. In some embodiments, the latex-based waste may be received from any of a variety of institutions, companies, corporations, or other such entities, that perform waste recycling operations. Any of various procedures may be used to formulate the latex-based waste into a recycled latex emulsion suitable for use in the process 100.

In the particulate material acquisition step 108, a suitable particulate material is acquired for use in the preparation process 100. Preferably, the particulate material is of a variety suitable for forming a packaging material useable as an alternative to vermiculite. In some embodiments, the particulate material comprises cellulose and lignin, such as is found in sawdust. It has been observed that using sawdust in the preparation process 100 produces a packaging material which exhibits a substantial reduction of fine dust often encountered with vermiculite-based packaging materials, as described herein.

At a mixing step 112, a suitable portion of the recycled latex emulsion is mixed with a suitable portion of the particulate material. In some embodiments, the mixing step 112 may further comprise including with the recycled latex emulsion and particulate material suitable portions of additional desired components, such as by way of non-limiting example, various plasticizers, coloring agents, or hardeners. As will be appreciated, the types and quantities of additional components will depend upon desired properties of the end-product of the preparation process 100. In some embodiments, the mixing may be accomplished by way of a typical mixing apparatus, such as a pug mill, or other similar tank-like container within which an auger is mounted. In some embodiments, the auger is rotated so as to achieve a desired blending of the particulate material and the recycled latex emulsion within the tank. It will be appreciated that the recycled latex emulsion operates as an agglomeration agent to bind the particulate material and the additional components, thereby forming a latex-based pulp.

Once the mixing step 112 is complete, the preparation process 100 advances to a dispensing step 116, wherein the latex-based pulp may be dispensed so as to form a desired shape. It should be understood that the latex-based pulp can be formed into any desired shape, such as by way of non-limiting example, latex-based packaging peanuts which provide an advantageously dust-free alternative to vermiculite packaging peanuts. In some embodiments, the latex-based pulp is dispensed by way of industrial extruders. As will be appreciated, the particular dispensing or extruding machinery will depend upon the desired shape of the end-product of the preparation process 100. In some embodiments, the latex-based pulp may be dispensed by way of food processing extruders which are well known in the art and are commercially available from a wide variety of manufacturers for the production of cheese puff snack foods.

After having been dispensed and formed into desired latex-based shapes, the preparation process 100 advances to a drying step 120 wherein the latex-based pulp is dried and cured in the desired shape. It will be appreciated that a specific method for drying the latex-based pulp, as well as the amount of time required for drying, will depend upon the particular shape of the end-product of the process 100. In some embodiments, the latex-based shape is dried naturally by way of unaided atmospheric evaporation. In some embodiments, a drying agent or a solidifier 124 may be incorporated into the mixing step 112 so as to reduce the time required to complete the drying step 120. Further, in some embodiments the latex-based shape may be dried by using conventional drying methods, such as by way of non-limiting example, hot air, microwave heating, or radiant infrared heating. For instance, in some embodiments the latex-based shaped may be preliminarily dried by way of microwave heating and then finally dried by way of a hot air furnace. In some embodiments, cooling methods may be coupled with the heating methods so as to achieve a desired level of moisture within each cured latex-based shape. Various other methods for drying and curing the latex-based shapes will be apparent to those skilled in the art without detracting from the spirit and scope of the present disclosure.

Once the drying of the latex-based shape is complete, the preparation process 100 advances to a moisture regulation step 128, wherein a moisture level of the latex-based shape is measured. As will be appreciated, the desired level of moisture within the latex-based shape will depend upon the particular end-product of the preparation process 100. When the latex-based shape is found to contain too much moisture, an additional drying step 132 is applied to the latex-based shape. Similar to the drying step 120, in the additional drying step 132 the latex-based shape may be dried naturally by way of unaided atmospheric evaporation. In some embodiments, the additional drying step 132 may comprise using conventional drying methods, such as hot air, microwave heating, or radiant infrared heating to regulate the moisture within the latex-based shape. Further, a cooling process may be incorporated into the conventional drying methods so as to achieve a desired level of moisture content within the latex-based shape.

Once the desired level of moisture content has been achieved, the preparation process 100 proceeds to an absorption treatment step 136. As will be appreciated, once finished, the latex-based shape may be exposed to moisture from a variety of sources, such as atmospheric moisture or direct contact with various liquids. An absorption of moisture may have a detrimental effect on the structural integrity of the latex-based shape. For this reason, protecting the finished latex-based shape from future liquid exposure, due either to atmospheric moisture or direct liquid contact, operates advantageously to preserve the structural integrity and longevity of the latex-based shape. In the absorption treatment step 136, the latex-based shape is surface treated so as to limit absorption of moisture. In some embodiments, the surface treatment may comprise applying a chemical coating to the latex-based shape wherein the chemical coating limits moisture absorption by the latex-based shape. In some embodiments, the surface treatment may comprise any of various well known mechanical surface treatments to limit moisture absorption by the latex-based shape. As will be appreciated by those skilled in the art, a wide variety of surface treatments and methods for limiting moisture absorption by the latex-based may be practiced, without limitation, and within the spirit and the scope of the present disclosure.

Once the desired level of moisture content has been achieved, and the latex-based shape has been treated to limit future moisture absorption, the preparation process 100 finishes at a step 140 wherein the latex-based shape is yielded as an end-product, having the desired shape and properties. Preferably, the end-product is a resilient and absorbent packaging material. In a preferred embodiment, wherein the end-product comprises latex-based packaging peanuts, the end-product comprises a resilient, absorbent, and loose packaging material advantageously suited to be used so as to separate and cushion forces between containers during transportation in a larger container. As will be appreciated, latex-based packaging peanuts are very well suited for filling voids disposed between containers, as well as various other objects, and provide an advantageously dust-free alternative to vermiculite-based packaging peanuts, as mentioned herein. Furthermore, once the latex-based end-product of the present disclosure reaches an end of its useful life, due to physical degradation, the latex-based end-product may be used as a feedstock for any of various well known waste to energy processes, thereby substantially eliminating an environmental impact associated with conventional packaging materials.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for preparing a packaging material, comprising:
   receiving a portion of latex-based waste;
   formulating the latex-based waste into a recycled latex emulsion;
   acquiring a portion of particulate material;
   mixing and blending the latex-based emulsion with the particulate material so as to form a latex-based pulp;
   dispensing the latex-based pulp so as to form a desired shape;
   drying to cure the latex-based pulp into the desired shape;
   regulating a moisture level within the desired shape; and
   treating the latex-based shape to limit future moisture absorption, wherein treating the latex-based shape comprises applying a chemical coating thereto.

2. The method of claim 1, wherein the latex-based waste is recycled liquid latex paint.

3. The method of claim 1, wherein the latex-based waste comprises recycled semi-liquid latex paint and coatings.

4. The method of claim 1, wherein the particulate material comprises cellulose and lignin.

5. The method of claim 4, wherein the particulate material comprises sawdust.

6. The method of claim 1, wherein the desired shape of the packaging material comprises latex-based packaging peanuts.

7. The method of claim 1, wherein drying comprises allowing the latex-based pulp to dry naturally by way of unaided atmospheric evaporation.

8. The method of claim 1, wherein mixing further comprises incorporating a drying agent or a solidifier so as to reduce the time required to complete drying of the latex-based pulp.

9. The method of claim 1, wherein regulating further comprises measuring a moisture level within the desired shape.

10. The method of claim 9, wherein regulating further comprises applying additional drying to the desired shape when too much moisture is measured.

* * * * *